United States Patent
French (10) Patent No.: US 10,161,304 B2
(45) Date of Patent: Dec. 25, 2018

(54) TURBOCHARGER SYSTEM

(71) Applicant: Cummins Ltd, Huddersfield (GB)

(72) Inventor: Pierre Bernard French, Scholes Holmfirth (GB)

(73) Assignee: Cummins Ltd., Huddersfield (GB)

( * ) Notice: Subject to any disclaimer, the term of this patent is extended or adjusted under 35 U.S.C. 154(b) by 182 days.

(21) Appl. No.: 15/113,928

(22) PCT Filed: Feb. 2, 2015

(86) PCT No.: PCT/GB2015/050264
§ 371 (c)(1),
(2) Date: Jul. 25, 2016

(87) PCT Pub. No.: WO2015/114378
PCT Pub. Date: Aug. 6, 2015

(65) Prior Publication Data
US 2016/0341116 A1    Nov. 24, 2016

(30) Foreign Application Priority Data
Jan. 31, 2014  (GB) .................................... 1401704.0

(51) Int. Cl.
*F02B 33/44*     (2006.01)
*F04D 17/18*     (2006.01)
(Continued)

(52) U.S. Cl.
CPC ............ *F02B 39/14* (2013.01); *F01D 11/003* (2013.01); *F01D 25/16* (2013.01); *F01D 25/18* (2013.01);
(Continued)

(58) Field of Classification Search
CPC ........ F02B 39/14; F01D 11/003; F01D 25/16; F01D 25/20; F02D 17/02; F02D 41/0007;
(Continued)

(56) References Cited

U.S. PATENT DOCUMENTS 7,793,499 B2 *  9/2010  Gutknecht .............. F01D 25/18
                                                      184/6.11
7,946,118 B2 *  5/2011  Hippen .................... F02B 39/14
                                                      184/6.16
(Continued)

FOREIGN PATENT DOCUMENTS

CN    101318458 A    12/2008
DE    4026099 A1 *  10/1991 ............. F01D 25/18
(Continued)

OTHER PUBLICATIONS

An English Machine Translation of Fujimoto Misao et al. (Pub. No. JP 59-141724 A), published on Aug. 14, 1984.*
(Continued)

*Primary Examiner* — Thai Ba Trieu
(74) *Attorney, Agent, or Firm* — Faegre Baker Daniels LLP (57) ABSTRACT

A turbocharger system is provided having a compressor wheel and a turbine wheel connected by a shaft; a conduit configured to deliver a flow of lubricant to a bearing which supports the shaft, the conduit being provided with a valve; a sensor configured to monitor a speed of rotation of the shaft; and a controller configured to operate the valve to substantially stop the flow of lubricant to the bearing in response to detection of deceleration of the shaft and the speed of the shaft dropping below a threshold.

15 Claims, 4 Drawing Sheets

(51) Int. Cl.
*F04C 29/02* (2006.01)
*F02B 39/14* (2006.01)
*F01D 25/18* (2006.01)
*F01M 1/16* (2006.01)
*F01D 25/16* (2006.01)
*F01D 25/20* (2006.01)
*F01D 11/00* (2006.01)

(52) U.S. Cl.
CPC .............. *F01D 25/20* (2013.01); *F01M 1/16* (2013.01); *F05D 2220/40* (2013.01); *F16N 2250/16* (2013.01)

(58) Field of Classification Search
CPC ............ F02D 41/0087; F02D 41/0082; F05D 2220/40; F16N 2250/16; F16C 2360/24; Y02T 10/144
USPC ................ 60/605.3; 417/407; 184/6.11, 6.16
See application file for complete search history.

(56) References Cited

U.S. PATENT DOCUMENTS

| 8,015,810 | B2 | 9/2011 | Theobald | |
|---|---|---|---|---|
| 2008/0283337 | A1 | 11/2008 | Theobald | |
| 2013/0280032 | A1* | 10/2013 | Stump | F01D 25/18 415/1 |
| 2014/0044540 | A1* | 2/2014 | Uneura | F04D 29/057 384/121 |
| 2014/0119898 | A1* | 5/2014 | Nishida | F02B 39/14 415/170.1 |
| 2015/0047349 | A1* | 2/2015 | Palko | F02B 39/14 60/605.3 |
| 2015/0260056 | A1* | 9/2015 | Medda | F02B 39/14 60/605.3 |
| 2015/0369081 | A1* | 12/2015 | Takabatake | F02B 39/14 415/111 |

FOREIGN PATENT DOCUMENTS

| DE | 102011119521 A1 | 5/2013 |
|---|---|---|
| EP | 0092467 A1 | 10/1983 |
| JP | S59141724 A | 8/1984 |
| JP | 2010169066 A | 8/2010 |
| KR | 100292758 | 6/2001 |
| WO | WO2008122756 A1 | 10/2008 |
| WO | WO2012074789 A1 | 6/2012 |

OTHER PUBLICATIONS

Examination report (in Korean language) issued by the Korean Intellectual Property Office, dated Nov. 24, 2017, for related Application No. 10-2016-7022394;13 pages.

International Search Report and Written Opinion issued by the European Patent Office, dated Jan. 4, 2015, for related International Application No. PCT/GB2015/050264; 12 pages.

Letter Exam Report issued by the United Kingdom Intellectual Property Office, dated Jul. 14, 2014, for related Application No. GB1401704.0; 3 pages.

Letter examination report (in Chinese language), issued by the State Intellectual Property Office of People's Republic of China, dated May 21, 2018 for related Application No. CN2015800156737; 14 pages.

English Summary of Office Action, issued by the State Intellectual Property Office of People's Republic of China, dated May 21, 2018 for related Application No. CN2015800156737; 8 pages.

* cited by examiner

TURBOCHARGER SYSTEM

RELATED APPLICATIONS

The present application is a National Stage Application under 35 USC § 371 of PCT Application No. PCT/GB2015/050264, filed Feb. 2, 2015, which claims priority to GB Application No. 1401704.0, filed Jan. 31, 2014, the entire disclosures of which being hereby expressly incorporated herein by reference.

FIELD OF THE DISCLOSURE

The present disclosure generally relates to fuel injector seal assemblies for internal combustion engines and more particularly, to nozzle combustion shields and sealing members with improved heat transfer capabilities.

BACKGROUND

The present disclosure relates to a turbocharger system having a lubricant control system, and to a method of delivering lubricant to a turbocharger.

Turbochargers are well-known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power. The turbocharger shaft is conventionally supported by journal and thrust bearings, including appropriate lubricating systems, located within a central bearing housing connected between the turbine and compressor wheel housing.

The lubricating systems are supplied with lubrication (e.g. oil) which reduces friction between moving parts and stationary parts of the turbocharger, thereby facilitating smooth rotation of the shaft upon which the turbine wheel and compressor wheel are mounted. Seals are provided between the shaft and the central bearing housing, the seals acting to isolate the lubricant used by the lubricating systems from the turbine housing and the compressor housing. Despite the presence of these seals, some lubricant may leak from the lubricating systems into the compressor housing and into the turbine housing. Leakage of lubricant into the compressor housing is undesirable because the compressor wheel will drive the lubricant to the intake of the internal combustion engine to which it is connected. This will cause the lubricant to pass through the internal combustion engine, leading to undesirable effects such as the emission of increased pollution from the internal combustion engine. It is an object of the present disclosure to obviate or mitigate the above problem, or to provide a turbocharger system which is novel and inventive over the prior art.

SUMMARY

According to a first aspect of the disclosure there is provided a method of delivering lubricant to a turbocharger, the method comprising delivering a flow of lubricant to a shaft supporting bearing of the turbocharger during normal operation of the turbocharger, monitoring the speed of rotation of the shaft, when deceleration of the shaft is detected and when the speed of the shaft drops below a threshold, substantially stopping the flow of lubricant to the bearing. The method is advantageous because it reduces the likelihood of lubricant leaking into the compressor housing.

The threshold may be a speed which is higher than a speed at which boundary layer lubrication is sufficient to lubricate the bearing, the threshold being sufficiently low that, based on the rate of deceleration of the shaft, the speed of the shaft will drop to a speed at which boundary layer lubrication is sufficient to lubricate the bearing before the lubricant has drained from the bearing.

The valve may be controlled by a controller in which the threshold has been set.

The threshold may be stored in a memory.

The method may further comprise feeding a trickle of lubricant to the bearing after the flow of lubricant has been substantially stopped.

The threshold may be a speed at which boundary layer lubrication is sufficient to lubricate the bearing.

The speed at which boundary layer lubrication is sufficient to lubricate the bearing may correspond with a shaft velocity of up to 15 m/s.

The speed at which boundary layer lubrication is sufficient to lubricate the bearing may correspond with a shaft velocity of up to 10 m/s. According to a second aspect of the disclosure there is provided a turbocharger system comprising a turbocharger having a compressor wheel and a turbine wheel connected by a shaft, a conduit configured to deliver a flow of lubricant to a bearing which supports the shaft, the conduit being provided with a valve, a sensor configured to monitor the speed of rotation of the shaft, and a controller configured to operate the valve to substantially stop the flow of lubricant to the bearing when deceleration of the shaft is detected and when the speed of the shaft drops below a threshold.

The threshold may be a speed which is higher than a speed at which boundary layer lubrication is sufficient to lubricate the bearing, the threshold being sufficiently low that, based on the rate of deceleration of the shaft, the speed of the shaft will drop to a speed at which boundary layer lubrication is sufficient to lubricate the bearing before the lubricant has drained from the bearing. The threshold may be stored in a memory.

The valve may be configured to provide a trickle of lubricant when it has been operated to substantially stop the flow of lubricant. In other words, a full flow of lubricant to the bearing is stopped but a trickle (or drip feed) of lubricant is provided.

An additional conduit may extend around the valve, the additional conduit including a restriction that is configured to provide a trickle of lubricant to the bearing.

The turbocharger may further comprise an accumulator configured to store lubricant for subsequent delivery to the bearing.

The controller and/or the valve may be located at the turbocharger.

The threshold may be a speed at which boundary layer lubrication is sufficient to lubricate the bearing.

The speed at which boundary layer lubrication is sufficient to lubricate the bearing may correspond with a shaft velocity of up to 15 m/s. The speed at which boundary layer lubrication is sufficient to lubricate the bearing may correspond with a shaft velocity of up to 10 m/s.

According to a third aspect of the disclosure there is provided a method of delivering lubricant to a turbocharger of a hybrid vehicle, the method comprising delivering a flow of lubricant to a shaft supporting bearing of the turbocharger during normal operation of the turbocharger, monitoring the speed of the vehicle, when deceleration of the vehicle is detected and when the speed of the vehicle drops below a threshold, substantially stopping the flow of lubricant to the bearing. The threshold may be a speed which is higher than a speed at which switch-over to driving the vehicle using electrical power will occur.

According to a fourth aspect of the disclosure there is provided a method of delivering lubricant to a turbocharger of a hybrid vehicle, the method comprising delivering a flow of lubricant to a shaft supporting bearing of the turbocharger when the vehicle is being powered by an internal combustion engine, and substantially stopping the flow of lubricant to deliver a trickle of lubricant to the bearing when the vehicle is being electrically powered and the internal combustion engine is idling. According to a fifth aspect of the disclosure there is provided a turbocharger system of a hybrid vehicle, the turbocharger system comprising a turbocharger having a compressor wheel and a turbine wheel connected by a shaft, a conduit configured to deliver a flow of lubricant to a beating supporting the shaft, the conduit being provided with a valve, and a controller configured to operate the valve to substantially stop flow of lubricant to the bearing when deceleration of vehicle is detected and when the speed of the vehicle drops below a threshold.

The threshold may be a speed which is higher than a speed at which switch-over to driving the vehicle using electrical power will occur.

According to a sixth aspect of the disclosure there is provided a turbocharger system of a hybrid vehicle, the turbocharger system comprising a turbocharger having a compressor wheel and a turbine wheel connected by a shaft, a conduit configured to deliver a flow of lubricant to a bearing supporting the shaft, the conduit being provided with a valve, and a controller configured to operate the valve to deliver a flow of lubricant to the bearing when the vehicle is being powered by an internal combustion engine, and to substantially stop flow of lubricant to the bearing when the vehicle is being electrically powered and the internal combustion engine is idling. The valve may be configured to provide a trickle of lubricant when it has been operated to substantially stop the flow of lubricant. In other words, a full flow of lubricant to the bearing is stopped but a trickle (or drip feed) of lubricant is provided. An additional conduit may extend around the valve, the additional conduit including a restriction that is configured to provide a trickle of lubricant to the bearing.

According to a seventh aspect of the disclosure there is provided a method of delivering lubricant to a turbocharger forming part of an engine having a stop/start cycle, the method comprising delivering a flow of lubricant to a shaft supporting bearing of the turbocharger during normal operation of the engine, when a stop cycle is initiated substantially stopping the flow of lubricant to the bearing.

Substantially stopping the flow of lubricant to the bearing may be postponed if the speed of the shaft is so high that substantially stopping flow of lubricant to the bearing will cause damage to the bearing.

The flow of lubricant to the bearing may be fully stopped. The method may further comprise using a valve to direct lubricant to a sump instead of to the bearing.

According to an eighth aspect of the disclosure there is provided a turbocharger system for an engine having a stop/start cycle system comprising a turbocharger having a compressor wheel and a turbine wheel connected by a shaft, a conduit configured to deliver a flow of lubricant to a bearing which supports the shaft, the conduit being provided with a valve, and a controller configured to operate the valve to substantially stop flow of lubricant to the bearing when a stop cycle is initiated. The controller may be configured to postpone operation of the valve if the speed of the shaft is so high that substantially stopping flow of lubricant to the bearing will cause damage to the bearing.

The valve may be configured to direct lubricant to a sump instead of to the bearing. The valve may be operable to fully stop flow of lubricant to the bearing when the stop cycle is initiated.

BRIEF DESCRIPTION OF THE DRAWINGS

Specific embodiments of the present disclosure will now be described, by way of example only, with reference to the accompanying figures, in which.

DETAILED DESCRIPTION OF EMBODIMENTS OF THE DISCLOSURE

Figure 1:
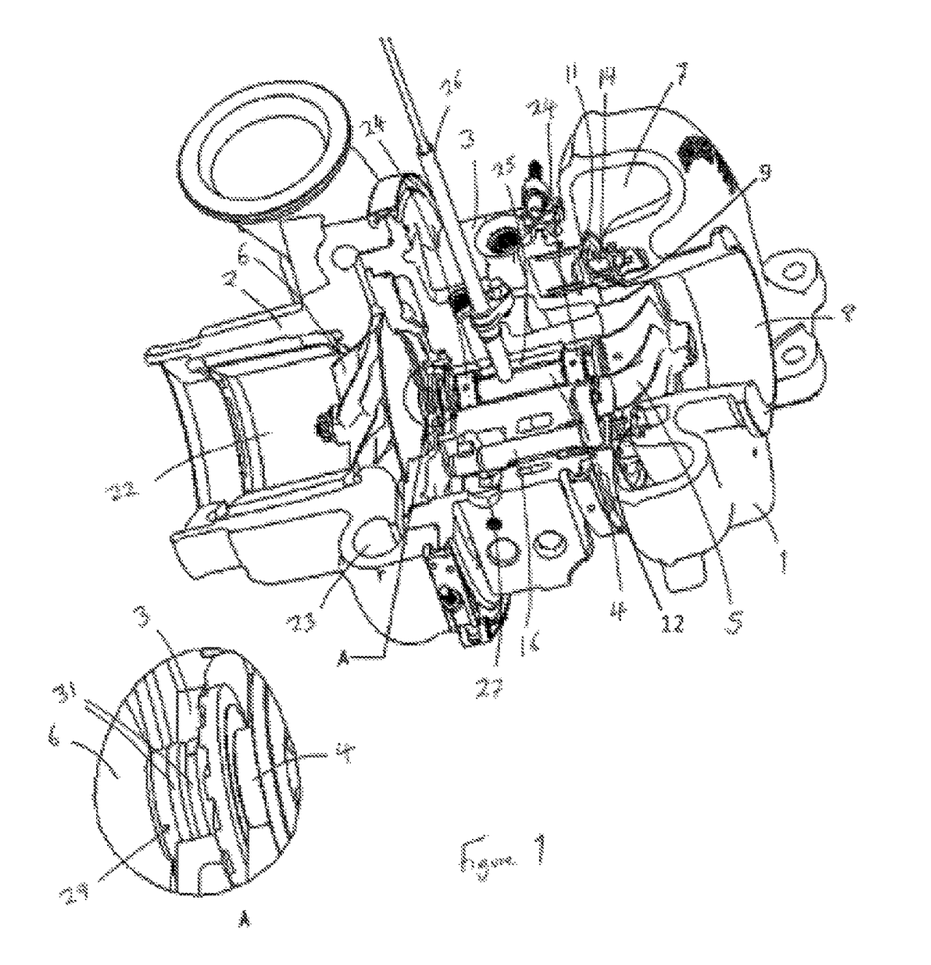
FIG. 1 is a perspective partial cross-section view of a variable geometry turbocharger.

FIG. 1 illustrates a variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about a turbocharger, axis on bearing assemblies 24 located in the bearing housing 3. The turbine housing 1 defines an inlet volute 7 to which gas from an internal combustion engine (not shown) is delivered, for example via one or more conduits (not shown). The exhaust gas flows from the inlet volute 7 to an axial outlet passageway 8 via an annular inlet passageway 9 and turbine wheel 5. The inlet passageway 9 is defined on one side by the face of a radial wall of a movable annular wall member, commonly referred to as a "nozzle ring", and on the opposite side by an annular shroud which forms the wall of the inlet passageway 9 facing the nozzle ring 11.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud, the vanes 14 project through suitably configured slots in the shroud 12, into a recess. In another embodiment (not shown), the wall of the inlet passageway may be provided with the vanes, and the nozzle ring provided with the recess and shroud.

The position of the nozzle ring 11 is controlled by an actuator assembly, for example an actuator assembly of the type disclosed in U.S. Pat. No. 5,868,552. An actuator (not shown) is operable to adjust the position of the nozzle ring 11 via moveable rods 16 that support the nozzle ring. Accordingly, by appropriate control of the actuator (which control may for instance be pneumatic, hydraulic, or electric), the axial position of the rods 16 and thus of the nozzle ring 11 can be controlled.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises aft present in an air inlet 22 and delivers the pressurised air to an air outlet volute 23 from which it is fed to an internal combustion engine (not shown in FIG. 1), for example via one or more conduits.

As mentioned further above, the shaft 4 rotates on bearing assemblies 24 located in the bearing housing 3. The bearing assemblies 24 may for example comprise balls held between an inner race and an outer race. The bearing assemblies 24 are provided in an annular cavity 25 to which lubricant (e.g. oil) is provided via a conduit 26. This cavity is hereafter referred to as the lubricant cavity 25. A drain 27 carries lubricant from the lubricant cavity 25. During normal operation of the turbocharger lubricant is continually pumped through the lubricant cavity 25, thereby facilitating smooth rotation of the shaft 4. FIG. 1 includes an enlarged view of the region where the shaft 4 meets the compressor wheel 6. A seal 29 is shown which seals the shaft 4 against the bearing housing 3. The seal 29 comprises a pair of piston rings 31 which extend around the shaft 4. A slinger 33 is provided adjacent to the piston rings 31, the slinger acting to direct lubricant radially outward.

The seal 29 does not completely prevent the passage of fluid from the lubricant cavity to the compressor wheel. This is because there must be some separation between the piston rings 31 and the bearing housing 3 in order to allow free rotation of the shaft 4. During normal operation of the turbocharger the compressor wheel 6 is spinning at a high number of revolutions per minute e.g. up to 100,000 rpm), and as a result the compressor wheel 6 generates considerable pressure in the compressor housing 2. The pressure on the compressor wheel side of the seal 29 is thus considerably greater than the pressure on the lubricant cavity side of the seal. As a result of this pressure difference, lubricant is inhibited from passing the seal 29 and travelling towards the compressor wheel 6. However, when the compressor wheel 6 is stationary or is rotating slowly the pressure on the compressor wheel side of the seal 29 may be atmospheric pressure (or close to atmospheric pressure) and may not be sufficient to inhibit passage of lubricant from the lubricant cavity 25 to the compressor wheel side of the seal. As a result, lubricant may leak through the seal 29 to the compressor wheel 6. The lubricant may subsequently be driven by the compressor wheel 6 to the inlet of the internal combustion engine. This may cause undesirable effects such as the emission of increased pollution by the internal combustion engine.

Figure 2:
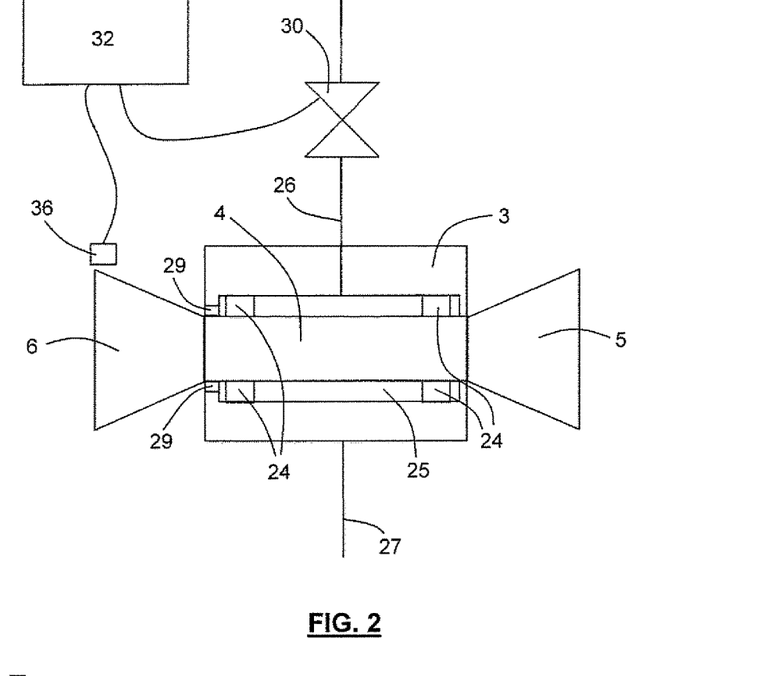
FIG. 2 schematically depicts a turbocharger system with a lubricant control system according to an embodiment of the disclosure.

FIG. 2 shows schematically a turbocharger system according to an embodiment of the disclosure, which comprises a turbocharger and a lubricant control system. The turbine wheel 5, compressor wheel 6, shaft 4 and bearing housing 3, which are represented schematically, may correspond with those shown in FIG. 1 (or may have some other configuration). The lubricant control system comprises a valve 30 operated by a controller 32 which controls the flow of the lubricant through the conduit 26 to the lubricant cavity 25 and to the bearing assemblies 24. During normal operation of the internal combustion engine and turbocharger, the valve 30 is open and lubricant is pumped through the valve. A continuous flow of lubricant is thus provided along the conduit 26 and through the lubricant cavity 25. The lubricant control system further comprises a sensor 36 which is configured to measure the speed of rotation of the compressor wheel 6 and provide an output to the controller 32. Since the compressor wheel 6, turbine wheel 5 and shaft 4 are all fixed together, the speed of rotation of the compressor wheel as measured by the sensor 36 is also the speed of rotation of the shaft and the turbine wheel. Thus, the sensor 36 monitors the speed of rotation of the shaft 4 via measurement of the speed of rotation of the compressor wheel 6. The sensor 36 may be a conventional sensor, as described in the prior art.

The lubricant control system is operative to close the valve 30 and substantially stop the flow of lubricant to the bearing housing 3 when the compressor wheel 6 is decelerating and when it is safe to do so (i.e. when substantially stopping the flow of lubricant will not cause the bearing assemblies 24 to be damaged).

In an embodiment, the valve 30 may be closed when it has been determined by the controller 32 that the compressor wheel 6 has decelerated to a speed of rotation which is such that boundary layer lubrication is sufficient to lubricate rotation of the shaft 4 without risk of damage to the bearing assemblies 24. The term boundary layer lubrication is intended to mean lubrication via a layer of lubricant present on surfaces of the bearing assemblies 24 which are in contact with one another and which move during rotation of the shaft 4. Boundary layer lubrication occurs when lubricant is not being pumped through the cavity 25 and when lubricant has drained away from the cavity via the drain 27. Although lubricant has drained away from the cavity 25 some lubricant remains on contacting surfaces of the bearing assemblies 24, and it is this lubricant which provides the boundary layer lubrication.

Figure 3:
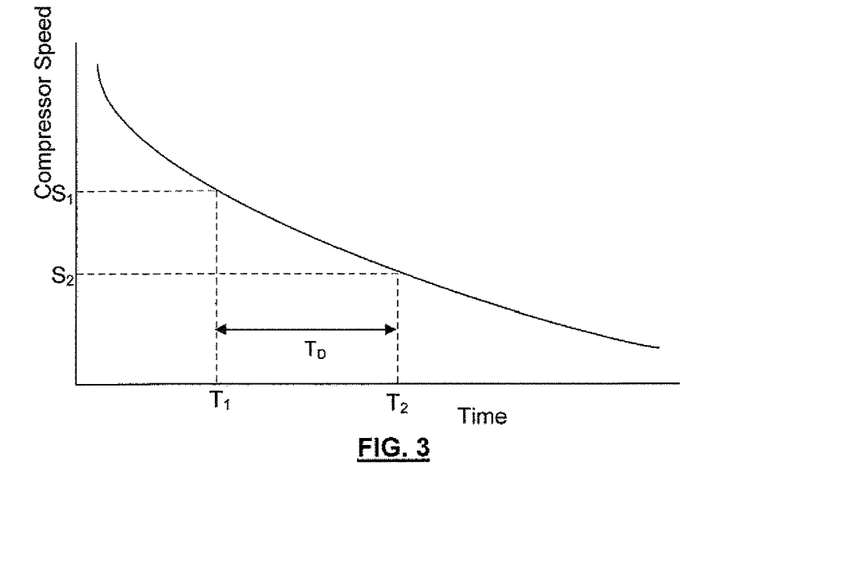
FIG. 3 is a schematic graph which illustrates one way in which the disclosure may operate.

In an embodiment, the controller 32 may determine that it is safe to close the valve 30 when the sensor 36 indicates that the compressor wheel 36 has decelerated to a speed which is not yet sufficiently slow that boundary layer lubrication is sufficient to lubricate rotation of the shaft 4. This is possible without damage occurring to the bearing assemblies 24 because a finite time will elapse between closing the valve 30 and draining of the lubricant from the lubricant cavity 25. During this finite time the speed of rotation of the shaft 4 reduces to a speed at which boundary layer lubrication is sufficient to lubricate rotation without damage to the bearing assemblies 24. FIG. 3 is a graph which illustrates schematically deceleration of the compressor wheel 6 (and turbine wheel) which will occur when a driver of a vehicle in which the turbocharger is fitted removes his or her foot from the accelerator pedal and thus closes the throttle of the internal combustion engine. The compressor wheel speed reduces gradually in a manner which is known and consistent for a given design of turbocharger. At time T2 the compressor wheel is rotating at a sufficiently slow speed S2 that boundary layer lubrication of the shaft 4 is sufficient. This speed will depend upon the dimensions of the turbocharger (as is discussed further below), but may for example be of the order of 10,000 rpm. The amount of time needed for the lubricant to drain out of the lubricant cavity 25 via the drain 27 may be known and may be consistent for a given design of turbocharger. As mentioned above, the rate at which the compressor wheel 6 (and turbine wheel) decelerates may also be known for a given design of turbocharger.

This information may be used to configure the controller 32 to close the valve 30 when the compressor wheel reaches a threshold rotational speed ST during deceleration of the compressor wheel. The time taken for the compressor wheel to decelerate from this threshold speed ST to the speed S2 at which boundary layer lubrication is sufficient to avoid bearing damage is shown in FIG. 3 as TD (T2-L). This time is less than or equal to the amount of time taken for lubricant to drain from the lubricant cavity 25 via the drain 27. The time TD may for example be of the order of a few seconds. The time TD may for example be around 1-2 seconds. The time TD may be selected to be significantly less than the time taken for lubricant to drain from the lubricant cavity 25 via the drain 27, in order to ensure that boundary layer lubrication never takes place before the speed has dropped to speed S2. The time TD may for example be at least 10% smaller than the time taken for lubricant to drain from the lubricant cavity 25 via the drain 27.

An advantage of the disclosure is that by closing the valve 30 prior to the compressor wheel 6 ceasing to rotate, lubricant is drained from the lubricant cavity 25 such that the lubricant cavity 25 is substantially empty of lubricant by the time the compressor wheel has ceased to rotate (e.g. with merely a boundary layer of lubricant remaining). As a result, there may be little or no leakage of lubricant past the seal 29. This reduces or avoids altogether lubricant being subsequently driven to the engine intake by the compressor wheel 6 (which could cause pollution or other undesirable effects). In an alternative embodiment of the disclosure the controller 32 is operative to close the valve 30 when the compressor wheel has decelerated to a threshold speed S2. That is, the valve 30 is closed when the speed of rotation is sufficiently low that boundary layer lubrication of the shaft 4 is sufficient, and before rotation of the shaft has ceased. This embodiment could for example be used if starting at speed S2, the time period needed for lubricant to drain from the lubricant cavity 25 is less than the time period until the compressor wheel 6 (and shaft) ceased to rotate. The embodiment could for example be used if starting at speed S2, the time period needed for lubricant to drain from the lubricant cavity 25 is less than the time period until the pressure generated by the compressor wheel 6 drops below a level where significant leakage of the lubricant into the compressor housing 22 could occur.

Embodiments of the disclosure avoid significant lubricant leakage because lubricant is removed from the lubricant cavity 25 before the pressure generated by the compressor wheel 6 drops below a level where significant leakage of the lubricant into the compressor housing 22 could occur. The embodiment in which the valve 30 is closed at threshold speed ST may be advantageous over the embodiment in which the valve is closed at threshold speed S2, because it may provide a reduced likelihood of leakage of lubricant past the seal 29. This is because a longer time elapses after closure of the valve 30 before the compressor wheel 6 decelerates to slow speeds and then ceases to rotate. It may be the case that at slow speeds of the compressor wheel 6 (e.g. 1,000 rpm or less) the pressure generated by the compressor wheel in the compressor housing 2 is less than the pressure needed to prevent leakage of lubricant past the seal 29. Closing the valve 30 as early as possible (e.g. at a speed ST or some other speed which is above the speed at which boundary layer lubrication is sufficient) will reduce the likelihood of this leakage occurring, and may eliminate it completely.

Figure 4:
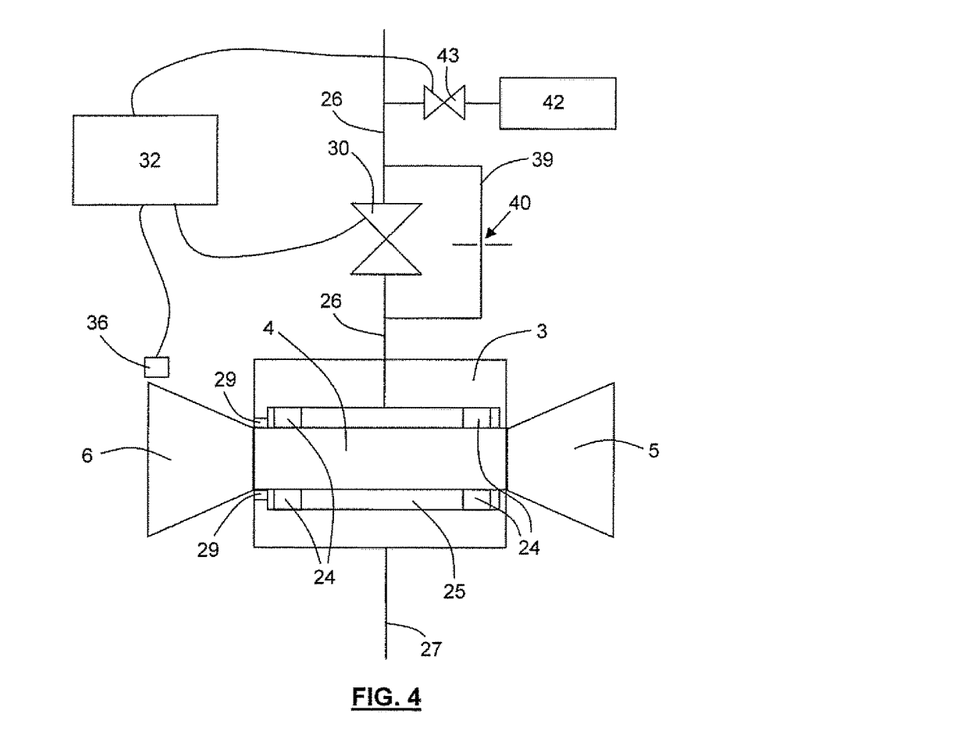
FIG. 4 schematically depicts a turbocharger system with a lubricant control system according to a modified embodiment of the disclosure.

A turbocharger system according to a modified embodiment of the disclosure is shown schematically in FIG. 4. In this embodiment an alternative lubricant path 39 runs parallel to the lubricant flow path which passes through the valve 30. This alternative lubricant path 39 includes an aperture 40 which limits the rate at which the lubricant is provided. The aperture 40 may for example have a diameter of around 1 mm. The aperture may provide for a trickle of lubricant (which may also be referred to as a drip-feed) through the alternative lubricant path 39. The alternative lubricant path 39 connects with the conduit 26 upstream of the lubricant cavity 25. Thus, a trickle of lubricant is provided to the lubricant cavity 25 via the alternative lubricant path 39.

During normal operation of the turbocharger, when the compressor wheel 6 and turbine wheel 5 are rotating at high speeds (e.g. well in excess of 10,000 rpm) the valve 30 is open. A continuous flow of lubricant is thus provided to the bearings 24 via the valve 30. Although lubricant is also provided to the bearings via the aperture 40, the amount of lubricant provided is negligible compared with the amount provided via the valve 30. When the compressor wheel 6 and turbine wheel 5 are rotating at relatively low speeds (e.g. 10,000 rpm or less) the valve 30 is closed, and lubricant is solely provided via the aperture 40. Thus, a trickle (or drip feed) of lubricant is provided to the bearings 24.

The trickle (or drip-feed) of lubricant to the bearings 24 may for example be advantageous in circumstances in which the boundary layer of lubrication needs to be replenished in order to avoid damage to the bearings. This could be the case for example if the compressor and turbine wheels 6, 5 might continue to rotate at a low speed for a considerable period of time. For example, the internal combustion engine may operate at idle for a considerable period, during which time the compressor and turbine wheels 6, 5 may rotate at around 1,000 rpm or less. In such circumstances, in the absence of a trickle (or drip-feed) of lubricant the lubricant providing boundary layer lubrication may become displaced and/or dirty over time, and this may ultimately lead to damage being caused to the bearings 24.

In an embodiment, instead of providing an alternative lubricant path 39 with an aperture, the valve 30 may be configured such that it provides a trickle (or drip-feed) of lubricant when it is in a closed configuration. That is, the valve does not provide a complete seal when it is closed, but instead provides a small gap through which lubricant can drip.

References to a trickle of lubricant may be interpreted as meaning that the lubricant is provided at a rate which is significantly less than the rate at which lubricant is provided when the compressor wheel 6 and turbine wheel 5 are rotating at high speeds. Thus, the flow of lubricant to the bearing has been substantially stopped, with only a trickle of lubricant being provided. In other words, full flow of the lubricant to the bearings is prevented. Embodiments of the disclosure may provide a flow of lubricant which is sufficient to keep the lubricant cavity 25 substantially full of lubricant during normal operation of the turbocharger, and may provide lubricant at a rate which is not sufficient to substantially fill the lubricant cavity when boundary layer lubricant is sufficient to lubricate the turbocharger (e.g. during idling of the engine). This second lower rate may be described as a trickle. An alternative term for the trickle of lubricant is a drip-feed of lubricant. The rate at which the lubricant is provided when boundary layer lubricant is sufficient to lubricate the turbocharger is very low (compared with the full flow of the lubricant), and thus the flow of lubricant may be referred to as being substantially stopped.

In an embodiment, the controller 32 may be configured to open the valve 30 before the turbocharger recommences operation. For example, in an internal combustion engine which is provided with a start-stop system, the engine may be restarted following a stop when a specific input is received. The engine may be stopped when the vehicle has stopped moving and the gear lever has been moved to neutral. The engine may be restarted when the clutch is subsequently depressed or when electrical power is required (e.g. for an air-conditioning system). The controller 32 may be configured to open the valve 30 when an input is received that will cause the engine to restart, in other words, the valve 30 is opened when re-starting of the engine is initiated. An advantage of this arrangement it ensures that lubricant is delivered to the lubricant cavity 25 of the turbocharger immediately when flow of lubricant is recommenced by the engine.

If it is desired to provide lubricant to the lubricant cavity 25 of the turbocharger more quickly than would be achieved by using the above arrangement, a store of lubricant may be retained in an accumulator upstream of the valve 30 for immediate delivery to the lubricant cavity when the valve 30 opens. An example of such an accumulator 42 is shown in FIG. 4. The accumulator 42 is connected via a valve 43 to the conduit 26 which carries lubricant to the lubricant cavity 25. This valve is referred to hereafter as the accumulator valve 43. Operation of the accumulator valve 43 is controlled by the controller 32. During normal operation of the turbocharger, the valve 30 leading to the turbocharger cavity 25 is open and lubricant is pumped through the cavity. The accumulator valve 43 is closed. When the valve 30 to the cavity 25 is closed the accumulator valve 43 is opened, and lubricant is thus pumped into the accumulator 42. The accumulator valve 43 is closed before pumping of lubricant through the internal combustion engine ceases, i.e. before operation of the internal combustion engine ceases. When operation of the internal combustion engine is re-started, the accumulator valve 43 and the valve 30 to the cavity 25 are both opened, such that lubricant flows from the accumulator 42 to the cavity. The accumulator 42 provides lubricant to the cavity 25 earlier than would otherwise be the case (there may be delay between re-starting the engine and lubricant being pumped to the cavity).

Although embodiments of the disclosure have been described in terms of a threshold speed of rotation of the compressor wheel 6 (and turbine wheel 5), a determining factor for whether or not boundary layer lubrication is sufficient to avoid damage to the bearings 24 is the rubbing speed between surfaces of the bearings which contact one another. The rubbing speed may be expressed as a shaft velocity (i.e. the speed at which the surface of the shaft is moving when it rotates). A shaft velocity of 10 m/s is sufficiently low that boundary layer lubrication is sufficient to avoid damage to the bearings 24. For a shaft diameter of around 2 cm this corresponds with a speed of rotation of the shaft of around 10,000 rpm. For a shaft with a diameter greater than around 2 cm, the speed of rotation of the shaft which corresponds with a shaft velocity of 10 m/s will be less than around 10,000 rpm. Conversely, for a shaft with a diameter less than around 2 cm, the speed of rotation of the shaft which corresponds with a shaft velocity of 10 m/s will be greater than around 10,000 rpm. Boundary layer lubrication may be sufficient to avoid bearing damage for shaft velocities in excess of 10 m/s. For example, boundary layer lubrication may be sufficient in some circumstances for shaft velocities up to 15 m/s. However, at such higher shaft velocities a risk of bearing damage arises. One factor which will influence whether or not bearing damage occurs is load on the bearings 24, the load being due to the weight of the rotating components and possibly also due to an unbalance of the rotating components. Another factor which will influence whether or not bearing damage occurs is the composition of the lubricant that is being used to lubricate the bearings 24. Thus, although embodiments of the disclosure may be used for shaft velocities up to 15 m/s, in order to minimise or eliminate the risk of bearing damage it may be preferable to restrict use of embodiments of the disclosure to shaft velocities up to 10 m/s. If embodiments of the disclosure are used for shaft velocities up to 15 m/s then a trickle (or drip-feed) of lubricant to the bearings 24 (for example as described above in connection with FIG. 5) may be used. This will reduce the risk of damage to the bearings 24.

The rate at which the compressor wheel 6 (and turbine wheel 5) decelerate will depend upon their inertia (which will also include a contribution from the shaft 4). Inertia of a rotating disk scales as the square of the radius of the disk (assuming that the disk has a constant thickness). It will therefore be appreciated that the inertia of the compressor wheel 6, turbine wheel 5 and shaft 4 will be greater for larger turbochargers. Thus, the rate of deceleration of a larger turbocharger will be smaller than the rate of deceleration of a smaller turbocharger.

A larger turbocharger will have a larger lubricant cavity 25 than a smaller turbocharger, and thus will contain more lubricant. It could therefore be expected that it would take longer for lubricant to drain from a larger turbocharger than from a smaller turbocharger. However, the drain 27 from the lubricant cavity 25 of a larger turbocharger may have a larger diameter than the drain from the lubricant cavity of a smaller turbocharger, meaning that the rate of lubricant drainage from a larger turbocharger may be faster than the rate of lubricant drainage from a smaller turbocharger. These two factors may cancel out one another to a significant extent, such that the time taken for lubricant to drain from the lubricant cavity is similar for different sizes of turbochargers. The time taken for lubricant to drain from the lubricant cavity may be a few seconds. The time taken may be determined via experimental measurement for different turbochargers.

The above factors may be taken into account to determine the threshold speed ST at which it is safe to shut the valve 30 during deceleration of a turbocharger. The threshold speed ST will be different for different designs of turbochargers. Once the threshold speed S1 has been determined for a given turbocharger design it can be input to the controller 32. This may for example be done by programming the controller 32 (e.g. if the controller is a microprocessor). Alternatively, it may be done by setting an electrical threshold value such as a voltage (e.g. if the controller is an electrical circuit). The controller 32 and valve 30 may together be considered to form a feed-forward control system. Embodiments of the disclosure may be particularly advantageous when used in engines which include a stop-start system which is configured to automatically shut down the internal combustion engine when a vehicle is stationary and restart it when the vehicle is about to move. Such engines may stop and start many times during a short period, for example if the vehicle is stuck in a traffic jam. In such circumstances, pumping lubricant to the lubricant cavity 25 then stopping the engine and hence stopping rotation of the compressor wheel and turbine wheel) may occur many times in quick succession. The cumulative effect of this may be to significantly increase the likelihood of lubricant leaking past the seal 29 into the compressor housing 22. The disclosure may avoid this problem because lubricant is removed from the lubricant cavity 25 before the pressure generated by the compressor wheel 6 drops to a level where significant leakage of the lubricant into the compressor housing 22 could occur. A modified embodiment of the disclosure which may be particularly advantageous for use in an engine having a stop-start system is shown schematically in FIG. 5. Components which correspond with those shown in FIGS. 2 and 4 are provided with corresponding reference numerals and are not described again here. In the embodiment shown in FIG. 5 a dump valve 30*a* is connected via a conduit 45 to a sump 46 of the engine. During normal operation of the engine, lubricant pumped to the dump valve 30*a* is directed by the dump valve 30*a* via a conduit 26 to the lubricant cavity 25. When a stop cycle of the engine is initiated, the dump valve 30*a* is triggered by the controller 32 such that the dump valve directs the lubricant to the sump 46. This arrangement provides a close to instantaneous drop of lubricant pressure in the lubricant cavity 25 when the engine stop cycle is initiated. This rapid drop of lubricant pressure in the lubricant cavity 25 is advantageous because it reduces the extent to which lubricant will leak past the seal 29 to the compressor cavity 22 (compared with the case if the dump valve 30*a* was not present). Using initiation of the stop cycle as the trigger to stop supplying lubricant to the lubricant cavity 25 is an alternative to using the measured speed of the compressor wheel during compressor deceleration as the trigger to stop supplying lubricant to the lubricant cavity. Using initiation of the stop cycle has the advantage that it does not require measurement of the compressor wheel speed but instead merely uses an existing engine control signal (i.e. the signal which represents stop cycle initiation). An engine control system which initiates the stop cycle may do so when the vehicle has stopped moving and the gear lever has been moved to neutral.

Figure 5:
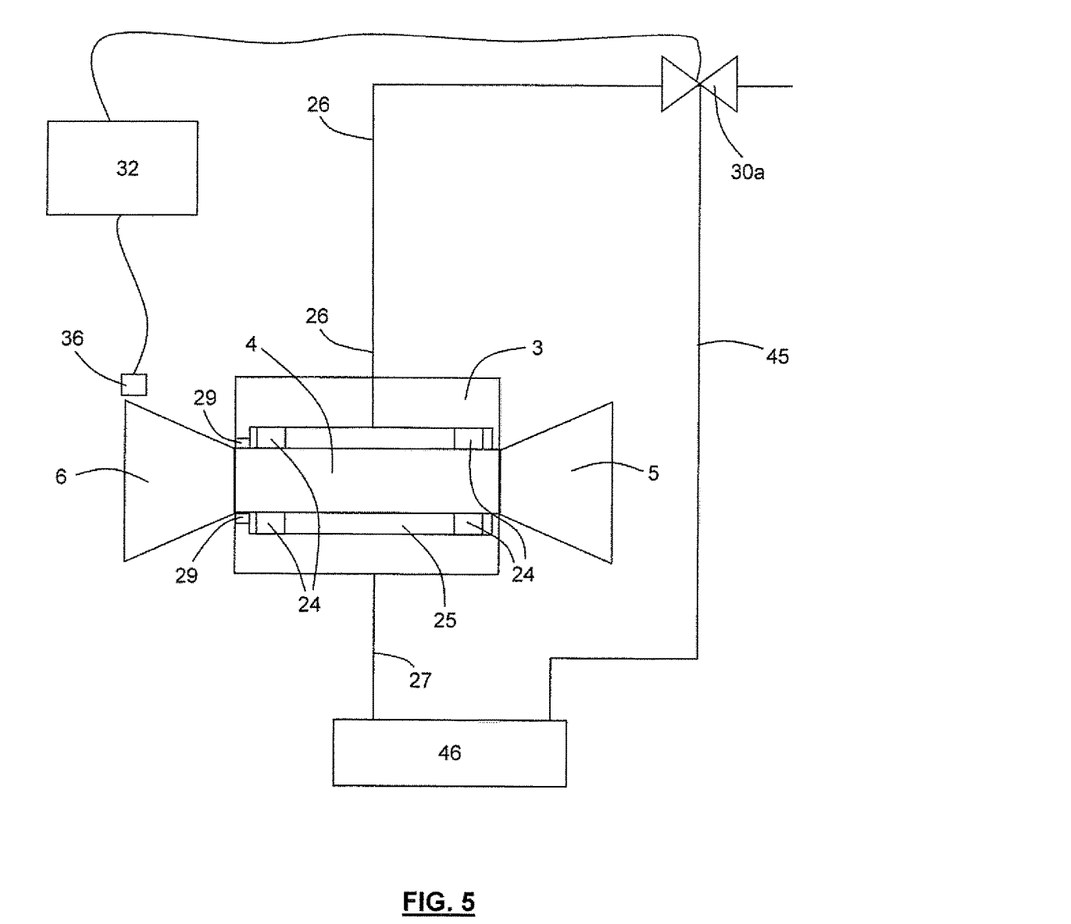
FIG. 5 schematically depicts a turbocharger system with a lubricant control system according to an alternative modified embodiment of the disclosure.

A potential disadvantage of using stop cycle initiation to trigger the dump valve 30*a* is that in some instances the compressor wheel speed may already have dropped below a speed at which leakage lubricant past the seal 29 may occur before the stop cycle is initiated. This potential disadvantage may be avoided by triggering the dump valve 30*a* using either the compressor wheel speed during compressor wheel deceleration or using stop cycle initiation (whichever occurs first). Similarly, the measured compressor wheel speed may be used to prevent stop cycle initiation from triggering the dump valve 30*a* when the compressor wheel is rotating at a speed at which it is still necessary to continue supplying lubricant to the bearings 24. In this situation triggering of the dump valve 30*a* is postponed until the compressor wheel has decelerated to a speed at which it is safe to do so (the manner in which the safe compressor wheel speed is determined is described further above). Operation of the dump valve 30*a* may be controlled by the controller 32. Once the stop cycle has been initiated and the dump valve 30*a* triggered, the dump valve should be closed before the engine is restarted. This avoids the possibility that the dump valve 30*a* remains open and is directing lubricant to the sump 46 during acceleration of the shaft 4.

After the stop cycle has occurred and the dump valve 30*a* has been triggered, a start cycle for the engine will subsequently occur. When the start cycle is initiated the dump valve 30*a* is shut such that it no longer directs lubricant to the sump 46 but instead directs lubricant to the lubricant cavity 25. Thus, lubricant pressure is restored to the lubricant cavity 25 when the engine restarts.

When an embodiment of the disclosure is provided in an engine having a stop-start system there may be no benefit in providing a trickle (or drip feed) to the bearing when the engine has stopped (the engine is not idling and thus lubricant providing boundary layer lubrication does not need to be replenished). However, a trickle (or drip feed) of lubricant may nevertheless be provided. This will happen if a valve used in the embodiment is configured to provide a trickle (or drip feed) of lubricant (e.g. if the valve is the same as that used in other embodiments which utilise this functionality). Thus, in embodiments for an engine having a stop-start system the flow of lubricant to the bearing may be substantially stopped with a trickle of lubricant being provided. In some embodiments for an engine having a stop-start system the flow of lubricant to the bearing may be fully stopped with no trickle of lubricant being provided.

In the above described embodiments the controller 32 may for example comprise part of an engine control unit which controls operation of the internal combustion engine. Where this is the case, the controller 32 may be located remotely from the turbocharger. Alternatively, the controller 32 may be separate from the engine control unit. Where this is the case the controller 32 may be located at the turbocharger. The controller may for example be provided on or within the bearing housing 3 of the turbocharger. Similarly, the valve 30 may be located at the turbocharger (e.g. provided on or within the bearing housing 3 of the turbocharger).

Figure 6:
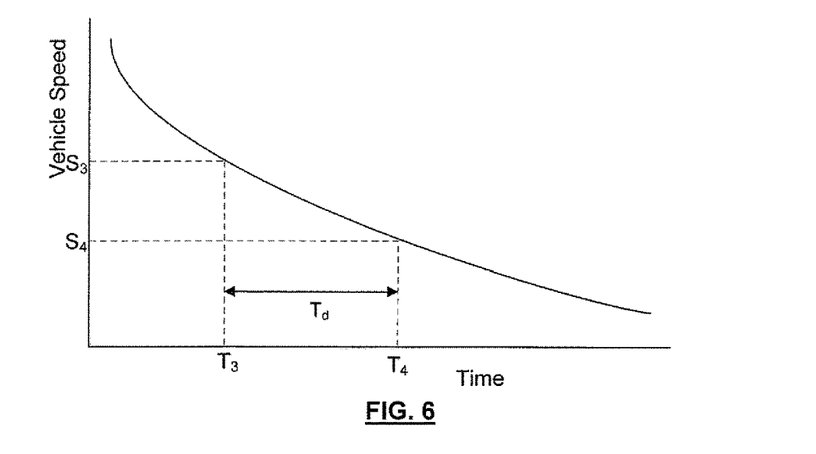
FIG. 6 is a schematic graph which illustrates another way in which the disclosure may operate.

Embodiments of the disclosure may be advantageous when used in a hybrid engine, i.e. an engine which comprises an internal combustion engine and an electrical motor both of which are configured to power a vehicle. In a typical hybrid engine the internal combustion engine is used to power the vehicle when the vehicle is travelling at relatively high speeds and the electrical motor is used to power the vehicle when the vehicle is travelling at relatively slow speeds. Switch-over from internal combustion engine power to electrical power may occur when the vehicle decelerates to a particular speed. When switch-over occurs the internal combustion engine will either stop operating or will idle. When the engine is idling the compressor wheel 6 may rotate at a speed which is low enough that boundary layer lubrication is sufficient to lubricate rotation of the shaft 4. The speed of rotation may for example be around 1,000 rpm or less when the engine is idling. The engine may be idling for a considerable period of time whilst the electrical motor is powering the vehicle. In such circumstances a trickle (or drip feed) of lubricant to the bearings 24 is advantageous because it will prevent bearing damage due to lubricant becoming displaced and/or dirty over time. An embodiment of the disclosure may be used to close the valve 30 when deceleration of the vehicle is detected, the valve being closed a predetermined time before switchover to electrical power occurs. Referring to FIG. 6, switch-over to electrical power may occur at vehicle speed S4, and the valve 30 may be closed at threshold vehicle speed S3. The corresponding elapsed time Td between these two speeds allows lubricant to drain from the lubricant cavity of the turbocharger before the speed of rotation of the compressor wheel drops to a speed at which lubricant may leak significantly into the compressor housing.

The rate of deceleration of the vehicle will depend upon how strongly the brakes of the vehicle are being applied. The relationship between speeds S3, S4 and elapsed time Td will correspondingly differ. Thus, for example the threshold speed S3 for a first rate of deceleration may be lower than the threshold speed S3 for a faster rate of deceleration. The controller 32 may for example store information about the relationships between rates of deceleration and threshold speeds, and may use these to determine when to close the valve 30. The relationships may be stored in any suitable manner. For example, a look-up table may be used.

An embodiment of the disclosure for a hybrid engine may be configured to deliver a flow of lubricant to the bearing when the internal combustion engine is powering the vehicle and deliver a trickle of lubricant to the internal combustion engine when electricity is powering the vehicle (when the internal combustion engine is idling). This may be advantageous irrespective of whether the flow of lubricant is substantially stopped using the timing described above in relation to FIG. 6 or using some other timing. Thus, embodiments of the disclosure for a hybrid engine may use any suitable timing for substantially stopping the flow of lubricant (e.g. the flow of lubricant is substantially stopped when switch over to electrically powering the vehicle occurs).

Embodiments of the disclosure may be advantageous when exhaust braking is used. During exhaust braking the speed of rotation of the turbine wheel 5 and compressor wheel 6 is low, and the pressure of exhaust gas around the turbine wheel may be such that it pushes past a seal between the shaft 4 and the bearing housing 3 and enters the lubricant cavity 25. The pressure of this exhaust gas in the lubricant cavity 25 will tend to push lubricant past the seal 29 into the compressor housing 22. Because embodiments of the disclosure drain lubricant from the lubricant cavity 25 when it is safe to do so, leakage of lubricant into the compressor housing during exhaust braking may be reduced or eliminated.

References to bearing damage may be interpreted as meaning a bearing wear rate which is well in excess of the bearing wear rate that would be seen during conventional bearing use. Bearing damage also encompasses bearing seizure. The internal combustion engine may for example be a diesel engine or may be a petrol engine.

The invention claimed is:

1. A turbocharger system for an engine having a stop/start cycle system comprising:
   a turbocharger having a compressor wheel and a turbine wheel connected by a shaft;
   a conduit configured to deliver a flow of lubricant from a lubricant sump to a bearing which supports the shaft; wherein the conduit is provided with a valve; and
   a controller configured to operate the valve to stop, or reduce to a trickle, the flow of lubricant being delivered to the bearing when a stop cycle of the engine is initiated.

2. The turbocharger system of claim 1, wherein the controller is configured to delay operation of the valve if the speed of the shaft is so high that stopping, or reducing to a trickle, the flow of lubricant to the bearing will cause damage to the bearing.

3. The turbocharger system of claim 1 wherein the valve is configured to direct lubricant to the lubricant sump instead of to the bearing.

4. The turbocharger system of claim 1, wherein the valve is operable to fully stop flow of lubricant being delivered to the bearing when the stop cycle of the engine is initiated.

5. A turbocharger system, the turbocharger system comprising:
   a turbocharger having a compressor wheel and a turbine wheel connected by a shaft;
   a conduit configured to deliver a flow of lubricant from a lubricant sump to a bearing supporting the shaft; wherein the conduit is provided with a valve; and
   a controller configured to operate the valve to at least one of
   control the flow of lubricant to the bearing when the vehicle is being powered by an internal combustion engine; and
   stop, or reduce to a trickle, the flow of lubricant being delivered to the bearing when the vehicle is being electrically powered and the internal combustion engine is idling.

6. The turbocharger system of claim 5, wherein an additional conduit extends around the valve, the additional conduit including a restriction that is configured to provide a trickle of the flow of lubricant being delivered to the bearing.

7. A turbocharger system, the turbocharger system comprising:
   a turbocharger having a compressor wheel and a turbine wheel connected by a shaft, the turbine wheel configured to be driven by exhaust gas from an engine;
   a conduit configured to deliver a flow of lubricant from a lubricant sump to a bearing supporting the shaft; wherein the conduit is provided with a valve; and
   a controller configured to operate the valve to stop, or reduce to a trickle, the flow of lubricant being delivered to the bearing when deceleration of vehicle is detected the vehicle is detected and when the speed of the vehicle drops the vehicle drops below a threshold.

8. The turbocharger system of claim 7, wherein the vehicle is configured to be driven using electrical power; and wherein the threshold is a speed which is higher than a speed at which switch-over to driving the vehicle using electrical power will occur.

9. A turbocharger system comprising:
   a turbocharger having a compressor wheel and a turbine wheel connected by a shaft, the turbine wheel being configured to be driven by exhaust gas from an engine;
   a conduit configured to deliver a flow of lubricant from a lubricant sump to a bearing which supports the shaft; wherein the conduit is provided with a valve;
   a sensor configured to monitor the speed of rotation of the shaft during an engine operation; and
   a controller configured to operate the valve to stop, or reduce to a trickle, the flow of lubricant being delivered to the bearing in response to the shaft decelerating and the speed of the shaft dropping below a threshold;
   wherein the threshold is a speed being higher than a speed at which boundary layer lubrication is sufficient to lubricate the bearing and the threshold is sufficiently low, based on a rate of deceleration of the shaft, the speed of the shaft will drop to a speed at which boundary layer lubrication is sufficient to lubricate the bearing before the flow of lubricant has drained out of the turbocharger from the bearing.

10. The turbocharger system of claim 9, wherein the valve includes a small gap; and wherein when the valve has been operated, the flow of lubricant flows through the small gap to reduce the flow of lubricant to the trickle.

11. The turbocharger system of claim 9, wherein an additional conduit extends around the valve, the additional conduit including a restriction that is configured to provide a trickle of lubricant to the bearing.

12. The turbocharger system of claim 9, wherein the turbocharger further comprises an accumulator configured to store lubricant for subsequent delivery to the bearing.

13. The turbocharger system of claim 9, wherein the controller and/or the valve are located at the turbocharger.

14. The turbocharger system of claim 9, wherein the speed at which boundary layer lubrication is sufficient to lubricate the bearing corresponds with a shaft velocity of up to 15 m/s.

15. The turbocharger system of claim 9, wherein the speed at which boundary layer lubrication is sufficient to lubricate the bearing corresponds with a shaft velocity of up to 10 m/s.

\* \* \* \* \*